June 1, 1954
A. V. METLER
2,679,752
METHOD FOR MEASURING CORROSIVITY OF FLUIDS
Filed Nov. 25, 1949
2 Sheets-Sheet 1
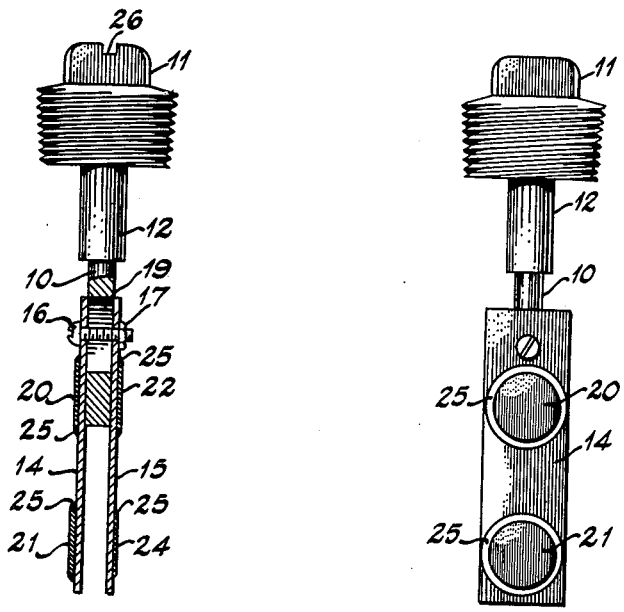
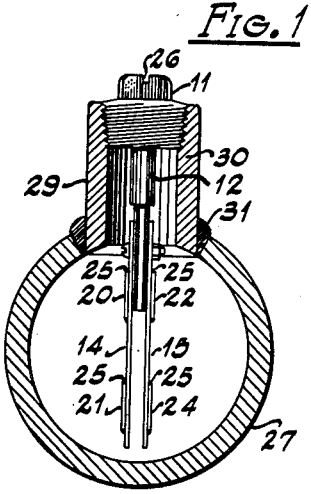
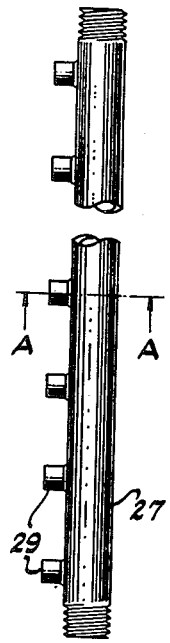
ALVIN V. METLER
INVENTOR.
BY Frederick E. Dumoulin
ATTORNEY

UNITED STATES PATENT OFFICE 2,679,752

METHOD FOR MEASURING CORROSIVITY OF FLUIDS

Alvin V. Metler, Dallas, Tex., assignor, by mesne assignments, to Socony-Vacuum Oil Company, Incorporated, New York, N. Y., a corporation of New York Application November 25, 1949, Serial No. 129,460

1 Claim. (Cl. 73—86)

This invention relates to measurement of the corrosivity of fluids and relates more particularly to measurement of corrosivity to ferrous and non-ferrous metals of acidic fluids.

Various types of fluids, both gases and liquids, are acidic in character or contain acidic compounds, and metal equipment such as pipe lines, valves, pumps, or other equipment either of ferrous or non-ferrous metal, in contact with these fluids is subject to corrosion as a result of the action of the acid. Corrosion of the metal equipment, being slow and located at the inner surfaces of the equipment, is not readily and immediately detectable, and, in order to determine the corrosivity of the fluids so that steps may be taken to prevent or inhibit the corrosion or to determine the effectiveness of steps already taken for this purpose, it has been customary to suspend metal test coupons or plates in the fluid for predetermined periods of time and determine the loss in weight, the decrease in linear dimensions, the depth of pitting, or other erosion effects as a measure of the corrosivity of the fluid. This method, however, is ineffective in giving information as to the corrosivity of the fluid until such time as a measurable loss in weight, decrease in linear dimension, or pitting has taken place, during which time an equivalent extent of erosion of the metal equipment will have occurred. Additionally, this method does not give any indication of effects of the fluid upon the metal equipment other than the effect of erosion.

It is an object of this invention to provide a method for measuring corrosivity of acid fluids. It is another object of this invention to provide a rapid method for measuring corrosivity of acid fluids. It is another object of this invention to provide a method whereby corrosivity of acid fluids may be determined prior to the onset of erosion of metal equipment. It is another object of this invention to provide a method for measuring the effect of acid fluids on metal equipment other than the erosion effect. Further objects of the invention will become apparent from the following description thereof.

In accordance with my invention, the corrosivity of an acid fluid is measured by exposing to the fluid for a predetermined period of time a metal test plate having a known rupture pressure and thereafter determining the decrease in the rupture pressure of the plate.

I have discovered that acid fluids affect metals in contact therewith not only by corroding the metals, i. e., eroding or wearing away the metals, but also by reducing their rupture pressure, and that a decrease in rupture pressure takes place prior to the time any measurable erosion of the metal has taken place. By rupture pressure, I mean the pressure differential which must be applied over two parallel faces of the metal in order to effect rupturing of the metal. I have also discovered that the time required for any given decrease in rupture pressure, or the extent of decrease in rupture pressure within any given time, varies with the corrosivity of the fluid as indicated by the rate at which erosion is ultimately effected. Thus, by the method of the invention, the corrosivity of a fluid is determined prior to the onset of erosion whereby steps may be taken to prevent or minimize erosion before this effect occurs. Further, by the method of the invention, the effect of the fluid on the mechanical strength of the metal equipment is determined whereby steps may be taken to prevent or minimize damage or destruction of the equipment by bursting as a result of the imposition of pressure thereon.

While I do not wish my invention to be limited to the consequences of any theory, I believe that acid fluid in contact with metal reacts with the metal with formation of hydrogen and the hydrogen penetrates the intercrystalline spaces of the metal. Within the intercrystalline spaces, the hydrogen reacts with the non-metals present whereby some of the grain structure of the metal is lost in the form of gaseous products resulting in a weakening of the metal. Further, some of the gaseous products cannot escape and probably generate enormous pressures locally within the granular spaces thereby further weakening the metal.

In the practice of the invention, the metal plate is suspended in the fluid whose corrosivity is being tested. When the fluid whose corrosivity is being tested is a fluid in a pipe line, in a vessel, or in any other channel, container, etc., for example, the metal plate may be suspended in the fluid in place by means of a suitable holder. However, if desired, the plate may be suspended within a sample of the fluid withdrawn from the channel or container.

The metal plates to be employed may be in the form of discs, rectangles, or other desired shapes. In order that their rupture pressures may be exceeded within ranges of pressure readily attained, the metal plates are preferably relatively thin with respect to their length and width. For example, the plates may have a thickness up to .070 inch, and have a diameter of one inch, if circular, or a length and width each of one inch, if square. However, plates of any dimensions are satisfactory if the dimensions are such as to impart to the plates rupture pressures within measurably attainable limits.

In testing the corrosivity of a fluid, the plate or plates employed for determining the normal rupture pressure, i. e., the rupture pressure of the plates prior to subjection to the action of the fluid, and those exposed to the action of the fluid are preferably of the same type of metal and of the same dimensions. However, plates of dissimilar sizes or dissimilar metals may be employed if the relationship between their rupture pressures is known. Irrespective of similarity of the plates with respect to size and metal, of course, the plates should be free of individual differences in heat treatment, grain structure, blow holes, etc., which would render them non-uniform with respect to rupture pressure.

The plates may be of any type of metal subject to attack by the fluid whose corrosivity is being tested. Generally, it is desirable to employ plates of the same metal as the equipment in contact with the fluid. However, as is known some metals are more readily corroded by certain acids than other metals; for example, carbon steel is more readily corroded by acids such as hydrogen sulfide or carbon dioxide than alloy steel. Accordingly, it may be desirable to employ test plates of a metal more susceptible to the corrosive action of the fluid than the metal of the equipment in order to obtain a more rapid or more sensitive measurement of the corrosivity of the fluid.

It is preferred, for measuring the corrosivity of any given fluid, to expose a plurality of test plates to the action of the fluid in order to insure that an erroneous measurement, due to the specificity of a particular plate such as an undetected fracture, blow hole, or other cause of weakening therein, will not be obtained. The plates may each have the same thicknesses or may have different thicknesses, and where plates of different dimensions are employed, a plurality of plates of each thickness may be used. The use of a plurality of plates of different thicknesses is advantageous in that the effect of the fluid on the metal equipment, which equipment will vary in thickness, may be predicted with greater accuracy. Where the effect of the fluid with time is to be determined, a plurality of plates may be exposed to the fluid, and a plate, or preferably a plurality, or set, of these plates, which may be of the same thickness or different thicknesses, may be tested in series, i. e., from time to time in accordance with any desired time pattern, to determine the decrease in their rupture pressures.

The plates may be exposed to the action of the fluid either on one face or on both faces. Where both faces of the plates are exposed to the fluid, the decrease in rupture pressure of the plate will be more rapid than where one face is exposed. Accordingly, both faces of the plates may be exposed to the fluid where a more rapid measurement of the corrosivity of the fluid is desired. However, satisfactorily rapid measurements are obtainable generally by exposing one face of the plates to the fluid.

The method of the invention may be employed for measuring the corrosivity of any acid fluid, either liquid or gas. Examples of such fluids are crude petroleum oil containing hydrogen sulfide, natural gas containing hydrogen sulfide or carbon dioxide, salt water separated from crude petroleum oil, refined petroleum products containing hydrogen sulfide or carbon dioxide, etc. Examples of other such fluids are process streams containing hydrochloric acid, sulfuric acid, nitric acid, hydrofluoric acid, etc. The method of the invention is particularly applicable for measuring the corrosivity of fluids containing small amounts of acidic constituents or fluids only slightly acidic in character where chemical analyses of the fluids do not serve to adequately indicate their corrosivity. However, the invention is also applicable for measuring corrosivity of fluids having high acidity.

In the accompanying drawings,

Figure 1 is a front elevation of a holder for supporting the test plates within a pipe;

Figure 2 is a side elevation, partly in section, of the holder of Figure 1;

Figure 3 is an elevation of a pipe adapted to receive the test plate holders;

Figure 4 is a section along the line A—A of Figure 3;

Figure 5:
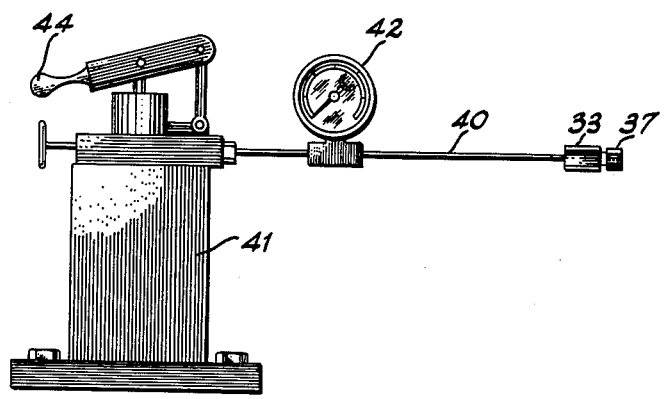
Figure 5 is an elevation of apparatus for measuring rupture pressures of the test plates.

Referring now to the drawings, more particularly Figures 1 and 2, a test plate holder, indicated generally by the numeral 10, comprises a threaded plug 11, a shaft or rod 12 connected to the plug, and two test plate supporting slips 14 and 15 held in position on shaft 12 by means of bolt 16 and nut 17, the bolt extending through slot 19 in the shaft 12. Attached to supporting slip 14 are test plates 20 and 21, each of different thicknesses, and attached to supporting slip 15 are test plates 22 and 24, also of different thicknesses. The test plates are attached to the supporting slips so that only one face of each plate will be exposed to the fluid and are attached by means of an adhesive 25 extending completely around the periphery of the plates. The adhesive may be of any suitable type which will retain the test plates on the supporting slips when in contact with the fluid whose corrosivity is being measured and which will prevent leakage of the fluid between the test plates and the supporting slips. A satisfactory adhesive for petroleum or other hydrocarbon fluid is polyethylene which retains its adhesive properties at high temperatures for extended periods of time. However, any suitable means may be employed for attaching the plates to the supporting slips. Slot 19 in shaft 12 is made sufficiently long to provide for adjustment in the position of supporting slips 14 and 15 along the shaft, and plug 11 is provided with slot 26 to indicate the alignment of supporting slips 14 and 15 when positioned on the shaft.

The plate holder 10 is adapted for subjecting the test plates to the action of a fluid flowing within a pipe line. A pipe line 27 through which the fluid is to be passed is provided with a plurality of wells 29 into which plate holders are received, and the wells comprise an internally threaded collar 30 entering the pipe and joined thereto by weld 31. The plate holders, having the plates positioned on the supporting slips 14 and 15, are screwed into the wells and are preferably positioned so that the sides of the slips face the direction of fluid flow in the pipe line, the alignment slot 26 indicating the position of the slips relative to the direction of fluid flow. By reason of the length of slot 19, adjustment of the position of the supporting slips on the shaft 12 may be made so that the holder may be tightened into the well without the bottoms of the slips touching the walls of the pipe line.

Figure 6:
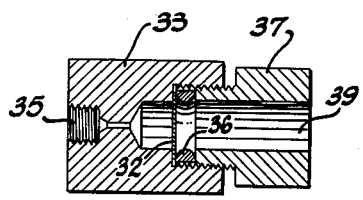
Figure 6 is an elevation in section of the blow-out assembly of Figure 5.

Determination of the rupture pressures of the plates may be made by means of the apparatus of Figures 5 and 6. The test plate 32 whose rupture pressure is to be determined is seated within blowout chamber 33 having channel 35 passing therethrough, gasket ring 36 is placed adjacent to the plate, and blowout head 37 having channel 39 passing therethrough is screwed into the chamber compressing the gasket against the plate. The assembly comprising the chamber, head, plate, and gasket is threaded onto line 40 connected to hydrostatic pressure pump 41 and provided with pressure gauge 42, and by operation of handle 44 a hydrostatic pressure is imposed upon the plate 32. The hydrostatic pressure is continually increased until the plate ruptures, the pressure on the gauge just prior to the time the plate ruptures being the rupture pressure. The ruptured plate is removed from the blowout chamber and another plate placed therein, the procedure being repeated for each plate whose rupture pressure is to be determined.

The following examples will be illustrative of the invention.

Example 1

Black iron plates having a thickness of .018 inch and a rupture pressure of 6200 pounds per square inch gauge were attached with polyethylene to supporting slips of plate holders and the holders screwed into wells on a pipe line carrying natural gas containing approximately 5% by volume of hydrogen sulfide. After exposure to the gas for ten minutes, the plates were removed and examined. No discernible erosion had occurred. The rupture pressures of the plates were then measured and found to be 3100 pounds per square inch gauge.

Example 2

Stainless steel plates having a thickness of .0625 inch were exposed in the same manner to the same type of gas as the plates in Example 1. The normal rupture pressure of the plates was 14,500 pounds per square inch gauge and after exposure to the gas the rupture pressure of the plates had decreased to 7100 pounds per square inch gauge. No discernible erosion of the plates as a result of exposure to the gas was found.

Example 3

Stainless steel plates having a thickness of .018 inch were attached to plate holders similarly as in Example 1 and screwed into wells on a pipe line carrying natural gas containing a trace of hydrogen sulfide. The normal rupture pressure of the plates was 9200 pounds per square inch gauge but after exposure to the gas for ten minutes the rupture pressure of the plates decreased to 5,000 pounds per square inch gauge. As in the previous examples, exposure of the plates to the gas resulted in no discernible erosion.

Having thus described my invention, it will be understood that such description has been given by way of illustration and example only and not by way of limitation, reference for the latter purpose being had to the appended claim.

I claim:

A method of measuring corrosivity of an acid fluid comprising exposing to said fluid a metal plate having two parallel plane faces and a known resistance to rupture when subjected to a pressure differential between said two parallel plane faces, removing said metal plate from exposure to said acid fluid prior to the time said metal plate becomes visibly eroded by said acid fluid, and subjecting said metal plate to a gradually increasing pressure differential between said two parallel plane faces thereof to determine the rupture pressure of said plate.

References Cited in the file of this patent

UNITED STATES PATENTS

| Number | Name | Date |
|---|---|---|
| 2,283,954 | Schroeder et al. | May 26, 1942 |
| 2,469,013 | Sobota | May 3, 1949 |
| 2,519,323 | Shank et al. | Aug. 15, 1950 |
| 2,539,578 | Headley | Jan. 30, 1951 |

OTHER REFERENCES

Article entitled "The Stress Corrosion of Metals" by M. A. Hunter et al. in A. S. M. "Metals Handbook," 1948 edition, pages 227–228.